United States Patent
Ali et al.

(10) Patent No.: US 12,513,541 B2
(45) Date of Patent: Dec. 30, 2025

(54) METHOD FOR PREDICTING ADVERSE OPERATING CONDITIONS

(71) Applicant: Nokia Technologies Oy, Espoo (FI)

(72) Inventors: Amaanat Ali, Espoo (FI); Anna Pantelidou, Massy (FR); Malgorzata Tomala, Wroclaw (PL); Ethiraj Alwar, Bangalore (IN); Sina Khatibi, Munich (DE)

(73) Assignee: Nokia Technologies Oy, Espoo (FI)

( * ) Notice: Subject to any disclaimer, the term of this patent is extended or adjusted under 35 U.S.C. 154(b) by 342 days.

(21) Appl. No.: 18/485,528

(22) Filed: Oct. 12, 2023

(65) Prior Publication Data
US 2024/0137787 A1 Apr. 25, 2024
US 2024/0236721 A9 Jul. 11, 2024

(30) Foreign Application Priority Data
Oct. 21, 2022 (IN) .............................. 202241060278

(51) Int. Cl.
*H04L 41/16* (2022.01)
*H04W 24/04* (2009.01)
*H04W 24/10* (2009.01)

(52) U.S. Cl.
CPC .............. *H04W 24/04* (2013.01); *H04L 41/16* (2013.01); *H04W 24/10* (2013.01)

(58) Field of Classification Search
None
See application file for complete search history.

(56) References Cited

U.S. PATENT DOCUMENTS

| | | |
|---|---|---|
| 2019/0387395 A1 | 12/2019 | Shaheen et al. |
| 2020/0235833 A1 | 7/2020 | Zhu et al. |
| 2020/0259575 A1 | 8/2020 | Bai et al. |
| 2020/0329369 A1 | 10/2020 | Pals et al. |
| 2021/0051592 A1 | 2/2021 | Wang et al. |
| 2021/0289406 A1 | 9/2021 | Feki et al. |
| 2021/0289414 A1 | 9/2021 | Shi et al. |
| 2021/0314242 A1* | 10/2021 | Majumder ............ H04L 43/022 |
| 2022/0116415 A1* | 4/2022 | Burgis ..................... H04L 67/51 |
| 2022/0361118 A1* | 11/2022 | Lee ......................... H04L 1/203 |

FOREIGN PATENT DOCUMENTS

WO 2022/084457 A1 4/2022

OTHER PUBLICATIONS

"3rd Generation Partnership Project; Technical Specification Group Radio Access Network; NR; NR and NG-RAN Overall Description; Stage 2 (Release 17)", 3GPP TS 38.300, V17.0.0, Mar. 2022, pp. 1-204.

(Continued)

*Primary Examiner* — Angela Nguyen
(74) *Attorney, Agent, or Firm* — Nokia Technologies Oy (57) ABSTRACT

An apparatus comprising: means for establishing a connection to a network; means for predicting, by an algorithm-based model implemented in said apparatus, whether any of configurable features of the apparatus infers a predetermined likelihood to cause an anomalous operating condition in said apparatus; and means for signalling information about said configurable features to the network.

15 Claims, 6 Drawing Sheets

(56) References Cited

OTHER PUBLICATIONS

"3rd Generation Partnership Project; Technical Specification Group Radio Access Network; Evolved Universal Terrestrial Radio Access (E-UTRA) and NR, Multi-connectivity; Stage 2 (Release 17)", 3GPP TS 37.340, V17.0.0, Mar. 2022, pp. 1-110.
"3rd Generation Partnership Project; Technical Specification Group Radio Access Network; NR; Radio Resource Control (RRC) protocol specification (Release 17)", 3GPP TS 38.331, V17.0.0, Mar. 2022, pp. 1-1221.
"3rd Generation Partnership Project; Technical Specification Group Radio Access Network; NG-RAN; Xn application protocol (XnAP) (Release 17)", 3GPP TS 38.423, V17.1.0, Jun. 2022, pp. 1-613.
Wu et al., "Dynamic Fuzzy Q-Learning for Handover Parameters Optimization in 5G multi-tier networks", International Conference on Wireless Communications & Signal Processing (WCSP), Oct. 15-17, 2015, 5 pages.
"3rd Generation Partnership Project; Technical Specification Group Radio Access Network; Evolved Universal Terrestrial Radio Access (E-UTRA); Radio Resource Control (RRC); Protocol specification (Release 17)", 3GPP TS 36.331, V17.2.0, Sep. 2022, pp. 1-1131.
Extended European Search Report received for corresponding European Patent Application No. 23202291.3, dated Mar. 18, 2024, 11 pages.
Latif et al., "Artificial Intelligence as an Enabler for Cognitive Self-Organizing Future Networks", arxiv, Feb. 9, 2017, 6 pages.

\* cited by examiner

METHOD FOR PREDICTING ADVERSE OPERATING CONDITIONS

TECHNICAL FIELD

The present invention relates to predicting adverse operating conditions in user equipment.

BACKGROUND

Highly complex networks, such as 5G NR, generate very large Radio Resource Control (RRC) configuration messages for defining the air interface, which may comprise a huge amount of data. RRC Reconfiguration message is one of the most complicated messages used in 5G NR, extending up to 8K bytes and even more as Rel-16 devices allow downlink/uplink (DL/UL) RRC message segmentation enabling segmentation of RRC messages up to 45 KB.

Future devices, i.e. both the user equipment (UEs) and network elements, will host Artificial Intelligence/Machine Learning (AI/ML) algorithms, which require a significant amounts of resources in both training and inference phase. The resource consuming AI/ML algorithms of the future UEs and network elements, combined with the processing of very large RRC configuration messages, the probability of having issues like overheating and overloading of computing resources (hardware and software) is very likely to increase.

Moreover, it may happen that some of the RRC configurations are not suitable for the network and/or the UE as they, as such, may create some adversity; high resource consumption at UE/network, overheating situation, etc. In such a situation, such as internal overheating, the UE may respond by triggering a UE Assistance Information to the network. The network may, in response, trim the RRC configuration to allow the UE to avert the situation. However, this method is purely reactive, and an anomalous operating condition has already taken place in the UE, thereby complicating to perform any corrective measures.

SUMMARY

Now, improved methods and technical equipment implementing the methods have been invented, by which the above problems are alleviated. Various aspects include a method, an apparatus and a non-transitory computer readable medium comprising a computer program, or a signal stored therein, which are characterized by what is stated in the independent claims. Various details of the embodiments are disclosed in the dependent claims and in the corresponding images and description.

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, there is provided an apparatus comprising means for establishing a connection to a network; means for predicting, by an algorithm-based model implemented in said apparatus, whether any of configurable features of the apparatus infers a predetermined likelihood to cause an anomalous operating condition in said apparatus; and means for signaling information about said configurable features to the network.

According to an embodiment, said anomalous operating condition comprises one or more of the following:

overheating of the apparatus;
overload of processing resources.

According to an embodiment, said configurable features causing said anomalous operating condition comprise one or more of the following:

frequency band(s) or band combinations for a set of frequency carriers and/or carrier bandwidths and/or modulations;
Artificial Intelligence/Machine Learning (AI/ML) algorithms implemented in said apparatus;
Machine Learning (ML) models processed in said apparatus;
any combination of the above.

According to an embodiment, the apparatus comprises means for receiving a request, from the network, for informing one or more configurable features of the apparatus potentially causing an anomalous operating condition in said apparatus.

According to an embodiment, said request identifies one or more of said configurable features.

According to an embodiment, the apparatus comprises means for running said model for the identified one or more features; and means for signaling information whether any of said identified one or more features of the apparatus infers a predetermined likelihood to cause an anomalous operating condition in said apparatus to the network.

According to an embodiment, the apparatus comprises means for receiving RRC reconfiguration parameters from the network; means for running said model for the RRC reconfiguration parameters; and means for signaling information whether any of said RRC reconfiguration parameters infers a predetermined likelihood to cause an anomalous operating condition in said apparatus to the network.

According to an embodiment, the apparatus comprises means for receiving an indication about RRC reconfiguration parameters selected by the network in a MAC Control Element; and means for acknowledging the RRC reconfiguration parameters in a RRC Reconfiguration complete message to the network.

According to an embodiment, the apparatus comprises means for detecting a predetermined likelihood to an anomalous operating condition to take place in said apparatus; means for sending a request to the network for switching to a lower order RRC configuration; means for receiving an indication about the lower order RRC reconfiguration parameters selected by the network in a MAC Control Element; and means for acknowledging the lower order RRC reconfiguration parameters in a RRC Reconfiguration complete message to the network.

A method according to a second aspect comprises establishing, by an apparatus, a connection to a network; predicting, by an algorithm-based model implemented in said apparatus, whether any of configurable features of the apparatus infers a predetermined likelihood to cause an anomalous operating condition in said apparatus; and signaling information about said configurable features to the network.

Computer readable storage media according to further aspects comprise code for use by an apparatus, which when executed by a processor, causes the apparatus to perform the above methods.

BRIEF DESCRIPTION OF THE DRAWINGS

For a more complete understanding of the example embodiments, reference is now made to the following descriptions taken in connection with the accompanying drawings in which.

DETAILED DESCRIPTION OF SOME EXAMPLE EMBODIMENTS

The following describes in further detail suitable apparatus and possible mechanisms for predicting adverse operating conditions in a user equipment.

Figure 1:
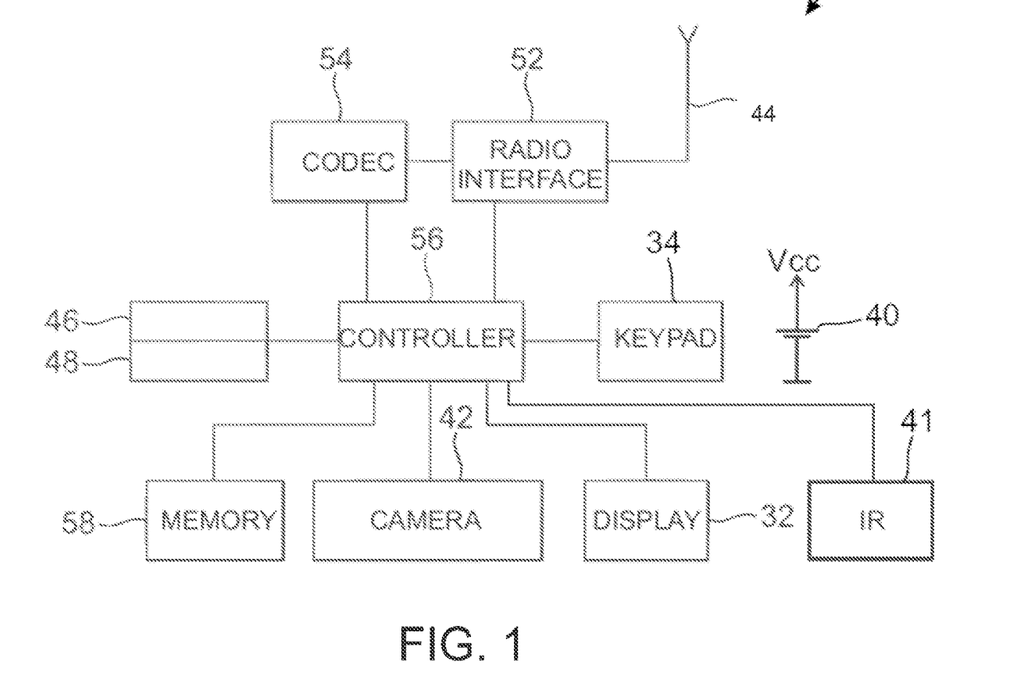
FIG. 1 shows a schematic block diagram of an apparatus for incorporating a beam distribution arrangement according to the embodiments.
Figure 2:
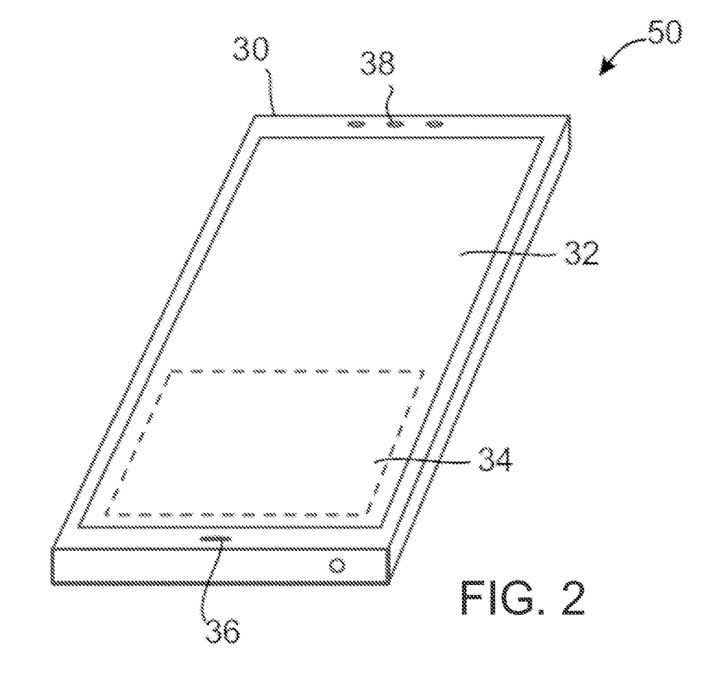
FIG. 2 shows schematically a layout of an apparatus according to an example embodiment.

In this regard, reference is first made to FIGS. 1 and 2, where FIG. 1 shows a schematic block diagram of an exemplary apparatus or electronic device 50, which may incorporate the arrangement according to the embodiments. FIG. 2 shows a layout of an apparatus according to an example embodiment. The elements of FIGS. 1 and 2 will be explained next.

The electronic device 50 may for example be a mobile terminal or user equipment of a wireless communication system. The apparatus 50 may comprise a housing 30 for incorporating and protecting the device. The apparatus 50 further may comprise a display 32 and a keypad 34. Instead of the keypad, the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device, such as anyone of: an earpiece 38, speaker, or an analogue audio or digital audio output connection. The apparatus 50 may also comprise a battery 40 (or the device may be powered by any suitable mobile energy device such as solar cell, fuel cell or clockwork generator). The apparatus may further comprise a camera 42 capable of recording or capturing images and/or video. The apparatus 50 may further comprise an infrared port 41 for short range line of sight communication to other devices. In other embodiments the apparatus 50 may further comprise any suitable short-range communication solution such as for example a Bluetooth wireless connection or a USB/firewire wired connection.

The apparatus 50 may comprise a controller 56 or processor for controlling the apparatus 50. The controller 56 may be connected to memory 58 which may store both user data and instructions for implementation on the controller 56. The memory may be random access memory (RAM) and/or read only memory (ROM). The memory may store computer-readable, computer-executable software including instructions that, when executed, cause the controller/processor to perform various functions described herein. In some cases, the software may not be directly executable by the processor but may cause a computer (e.g., when compiled and executed) to perform functions described herein. The controller 56 may further be connected to codec circuitry 54 suitable for carrying out coding and decoding of audio and/or video data or assisting in coding and decoding carried out by the controller.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In the following, different exemplifying embodiments will be described using, as an example of an access architecture to which the embodiments may be applied, a radio access technology (RAT) based on Long Term Evolution Advanced (LTE Advanced, LTE-A) or new radio (NR, 5G), without restricting the embodiments to such an architecture, however. A person skilled in the art appreciates that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet protocol multimedia subsystems (IMS) or any combination thereof.

Figure 3:
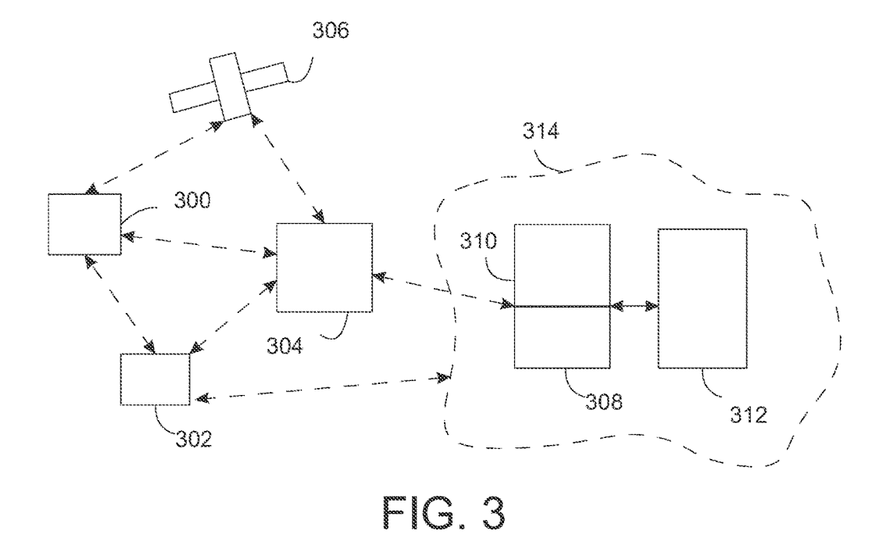
FIG. 3 shows a part of an exemplifying radio access network.

FIG. 3 depicts examples of simplified system architectures only showing some elements and functional entities, all being logical units, whose implementation may differ from what is shown. The connections shown in FIG. 3 are logical connections; the actual physical connections may be different. It is apparent to a person skilled in the art that the system typically comprises also other functions and structures than those shown in FIG. 3. The embodiments are not, however, restricted to the system given as an example but a person skilled in the art may apply the solution to other communication systems provided with necessary properties.

The example of FIG. 3 shows a part of an exemplifying radio access network.

FIG. 3 shows user devices 300 and 302 configured to be in a wireless connection on one or more communication channels in a cell with an access node (such as (e/g)NodeB) 304 providing the cell. The physical link from a user device to a (e/g)NodeB is called uplink or reverse link and the physical link from the (e/g)NodeB to the user device is called downlink or forward link. It should be appreciated that (e/g)NodeB s or their functionalities may be implemented by using any node, host, server or access point etc. entity suitable for such a usage.

A communication system typically comprises more than one (e/g)NodeB in which case the (e/g)NodeB s may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 310 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc. The CN may comprise network entities or nodes that may be referred to management entities. Examples of the network entities comprise at least an Access and Mobility Management Function (AMF).

The user device (also called a user equipment (UE), a user terminal, a terminal device, a wireless device, a mobile station (MS) etc.) illustrates one type of an apparatus to which resources on the air interface are allocated and assigned, and thus any feature described herein with a user device may be implemented with a corresponding network apparatus, such as a relay node, an eNB, and a gNB. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. Accordingly, the user device may be an IoT-device. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. The access nodes of the radio network form transmission/reception (TX/Rx) points (TRPs), and the UEs are expected to access networks of at least partly overlapping multi-TRPs, such as macro-cells, small cells, pico-cells, femto-cells, remote radio heads, relay nodes, etc. The access nodes may be provided with Massive MIMO antennas, i.e. very large antenna array consisting of e.g. hundreds of antenna elements, implemented in a single antenna panel or in a plurality of antenna panels, capable of using a plurality of simultaneous radio beams for communication with the UE. The UEs may be provided with MIMO antennas having an antenna array consisting of e.g. dozens of antenna elements, implemented in a single antenna panel or in a plurality of antenna panels. Thus, the UE may access one TRP using one beam, one TRP using a plurality of beams, a plurality of TRPs using one (common) beam or a plurality of TRPs using a plurality of beams.

The 4G/LTE networks support some multi-TRP schemes, but in 5G NR the multi-TRP features are enhanced e.g. via transmission of multiple control signals via multi-TRPs, which enables to improve link diversity gain. Moreover, high carrier frequencies (e.g., mmWaves) together with the Massive MIMO antennas require new beam management procedures for multi-TRP technology.

5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

Frequency bands for 5G NR are separated into two frequency ranges: Frequency Range 1 (FR1) including sub-6 GHz frequency bands, i.e. bands traditionally used by previous standards, but also new bands extended to cover potential new spectrum offerings from 410 MHz to 7125 MHz, and Frequency Range 2 (FR2) including frequency bands from 24.25 GHz to 52.6 GHz. Thus, FR2 includes the bands in the mmWave range, which due to their shorter range and higher available bandwidth require somewhat different approach in radio resource management compared to bands in the FR1.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 312, or utilize services provided by them. The communication network may also be able to support the usage of cloud services, for example at least part of core network operations may be carried out as a cloud service (this is depicted in FIG. 3 by "cloud" 314). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud RAN architecture enables RAN real time functions being carried out at the RAN side (in a distributed unit, DU) and non-real time functions being carried out in a centralized manner (in a centralized unit, CU 308).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well. The gNB is a next generation Node B (or, new Node B) supporting the 5G network (i.e., the NR).

5G may also utilize non-terrestrial nodes 306, e.g. access nodes, to enhance or complement the coverage of 5G service, for example by providing backhauling, wireless access to wireless devices, service continuity for machine-to-machine (M2M) communication, service continuity for Internet of Things (IoT) devices, service continuity for passengers on board of vehicles, ensuring service availability for critical communications and/or ensuring service availability for future railway/maritime/aeronautical communications. The non-terrestrial nodes may have fixed positions with respect to the Earth surface or the non-terrestrial nodes may be mobile non-terrestrial nodes that may move with respect to the Earth surface. The non-terrestrial nodes may comprise satellites and/or HAPS s. Satellite communication may utilize geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node 304 or by a gNB located on-ground or in a satellite.

A person skilled in the art appreciates that the depicted system is only an example of a part of a radio access system and in practice, the system may comprise a plurality of (e/g)NodeBs, the user device may have access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeB s are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

The Radio Resource Control (RRC) protocol is used in various wireless communication systems for defining the air interface between the UE and a base station, such as eNB/gNB. This protocol is specified by 3GPP in in TS 36.331 for LTE and in TS 38.331 for 5G. In terms of the RRC, the UE may operate in LTE and in 5G in an idle mode or in a connected mode, wherein the radio resources available for the UE are dependent on the mode where the UE at present resides. In 5G, the UE may also operate in inactive mode. In the RRC idle mode, the UE has no connection for communication, but the UE is able to listen to page messages. The UE may communicate with the eNB/gNB via various logical channels like Broadcast Control Channel (BCCH), Paging Control Channel (PCCH), Common Control Channel (CCCH), Dedicated Control Channel (DCCH), Dedicated Traffic Channel (DTCH).

The transitions between the states are controlled by a state machine of the RRC. When the UE is powered up, it is in a disconnected mode/idle mode. The UE may transit to RRC connected mode with an initial attach or with a connection establishment. If there is no activity from the UE for a short time, eNB/gNB may suspend its session by moving to RRC Inactive and can resume its session by moving to RRC connected mode. The UE can move to the RRC idle mode from the RRC connected mode or from the RRC inactive mode.

The actual user and control data from network to the UEs is transmitted via downlink physical channels, which in 5G include Physical downlink control channel (PDCCH) which carries the necessary downlink control information (DCI), Physical Downlink Shared Channel (PDSCH), which carries the user data and system information for user, and Physical broadcast channel (PBCH), which carries the necessary system information to enable a UE to access the 5G network.

The user and control data from UE to the network is transmitted via uplink physical channels, which in 5G include Physical Uplink Control Channel (PUCCH), which is used for uplink control information including HARQ feedback acknowledgments, scheduling request, and downlink channel-state information for link adaptation, Physical Uplink Shared Channel (PUSCH), which is used for uplink data transmission, and Physical Random Access Channel (PRACH), which is used by the UE to request connection setup referred to as random access.

Future devices, i.e. both UEs and network elements, will host Artificial Intelligence/Machine Learning (AI/ML) algorithms, which require a significant amount of resources in both training and inference phase. The AI/ML algorithms may be implemented, for example, by neural networks.

A neural network (NN) is a computation graph consisting of several layers of computation. Each layer consists of one or more units, where each unit performs an elementary computation. A unit is connected to one or more other units, and the connection may have associated with a weight. The weight may be used for scaling the signal passing through the associated connection. Weights are learnable parameters, i.e., values which can be learned from training data. There may be other learnable parameters, such as those of batch-normalization layers.

Two of the most widely used architectures for neural networks are feed-forward and recurrent architectures. Feed-forward neural networks are such that there is no feedback loop: each layer takes input from one or more of the layers before and provides its output as the input for one or more of the subsequent layers. Also, units inside a certain layer take input from units in one or more of preceding layers and provide output to one or more of following layers.

Initial layers (those close to the input data) extract semantically low-level features, and intermediate and final layers extract more high-level features. After the feature extraction layers there may be one or more layers performing a certain task, such as classification, semantic segmentation, object detection, denoising, style transfer, super-resolution, etc. In recurrent neural nets, there is a feedback loop, so that the network becomes stateful, i.e., it is able to memorize information or a state.

Neural networks are being utilized in an ever-increasing number of applications for many different types of device, such as mobile phones. Examples include image and video analysis and processing, social media data analysis, device usage data analysis, etc.

One of the important properties of neural networks (and other machine learning tools) is that they are able to learn properties from input data, either in supervised way or in unsupervised way. Such learning is a result of a training algorithm, or of a meta-level neural network providing the training signal.

In general, the training algorithm consists of changing some properties of the neural network so that its output is as close as possible to a desired output. For example, in the case of classification of objects in images, the output of the neural network can be used to derive a class or category index which indicates the class or category that the object in the input image belongs to. Training usually happens by minimizing or decreasing the output's error, also referred to as the loss. Examples of losses are mean squared error, cross-entropy, etc. In recent deep learning techniques, training is an iterative process, where at each iteration the algorithm modifies the weights of the neural net to make a gradual improvement of the network's output, i.e., to gradually decrease the loss.

Herein, term "model" may refer to "neural network", and the weights of neural networks are sometimes referred to as learnable parameters or simply as parameters.

Training a neural network is an optimization process. The goal of the optimization or training process is to make the model learn the properties of the data distribution from a limited training dataset. In other words, the goal is to learn to use a limited training dataset in order to learn to generalize to previously unseen data, i.e., data which was not used for training the model. This is usually referred to as generalization. In practice, data may be split into at least two sets, the training set and the validation set. The training set is used for training the network, i.e., to modify its learnable parameters in order to minimize the loss. The validation set is used for checking the performance of the network on data, which was not used to minimize the loss, as an indication of the final performance of the model. In particular, the errors on the training set and on the validation set are monitored during the training process to understand the following things:

- If the network is learning at all—in this case, the training set error should decrease, otherwise the model is in the regime of underfitting.
- If the network is learning to generalize—in this case, also the validation set error needs to decrease and to be not too much higher than the training set error. If the training set error is low, but the validation set error is much higher than the training set error, or it does not decrease, or it even increases, the model is in the regime of overfitting. This means that the model has just memorized the training set's properties and performs well only on that set but performs poorly on a set not used for tuning its parameters.

Highly complex networks, such as 5G NR, generate very large RRC configuration messages for defining the air interface, which may comprise a huge amount of data, comprising a plurality of information elements consecutive to, or nested within, each other. RRC Reconfiguration message is one of the most complicated messages used in 5G NR, extending up to 8K bytes and even more as Rel-16 devices allow DL/UL RRC message segmentation enabling segmentation of RRC messages up to 45 KB. For example, in LTE typically the sizes of RRC configuration messages used to be around 4 KB, and thus 5G NR may introduce a ten-fold increase in the size.

The resource consuming AI/ML algorithms of the future UEs and network elements, combined with the processing of very large RRC configuration messages, the probability of having issues like overheating and overloading of computing resources (hardware and software) is very likely to increase.

Moreover, it may happen that some of the RRC configurations are not suitable for the network and/or the UE as they, as such, may create some adversity; high resource consumption at UE/network, overheating situation, etc. In such a situation, such as internal overheating, the UE may respond by triggering a UE Assistance Information to the network. The network may, in response, trim the RRC configuration to allow the UE to avert the situation. However, this method is purely reactive, and an anomalous operating condition has already taken place in the UE, thereby complicating to perform any corrective measures.

Accordingly, there is a need for a method for proactively prevent such anomalous operating conditions to take place.

In the following, an enhanced method configuring a user equipment (UE) will be described in more detail, in accordance with various embodiments.

Figure 4:
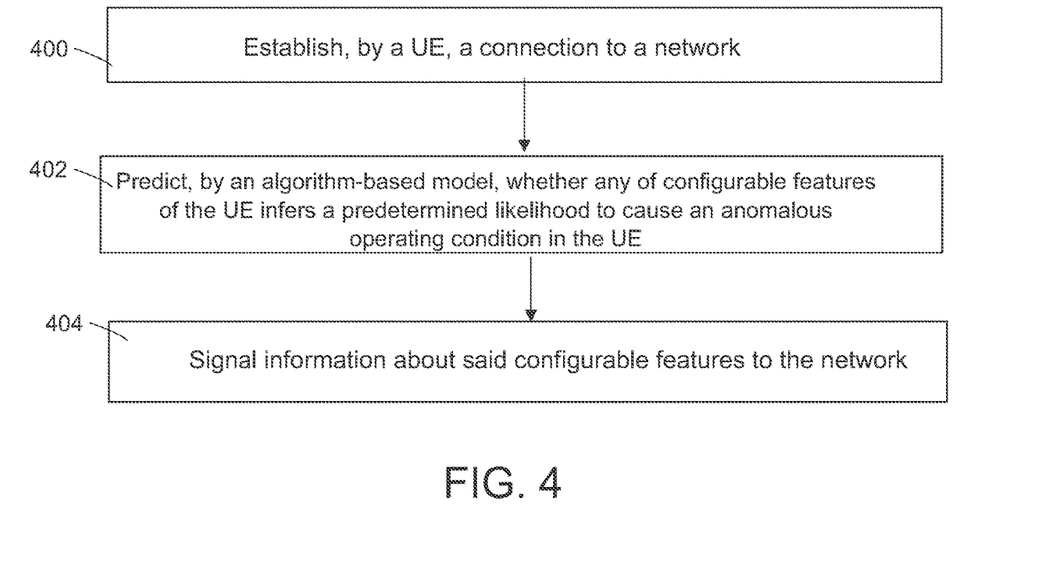
FIG. 4 shows a flow chart for a prediction procedure carried out by a user equipment according to an embodiment.

The method, which is disclosed in the flow chart of FIG. 4 as reflecting the operation of an apparatus, such as a user equipment (UE), wherein the method comprises establishing, by said apparatus, a connection to a network; predicting, by an algorithm-based model implemented in said apparatus, whether any of configurable features of the apparatus infers a predetermined likelihood to cause an anomalous operating condition in said apparatus, and signaling information about said configurable features to the network.

Thus, the UE may comprise a model for predicting anomalous operating condition caused by certain configurable features or their combination in advance. As there is no certain way to find out, if a UE will face an anomalous situation, such as an overload of processing resources and/or overheating, an algorithm-based model designed to predict such situations (anomaly detection) is implemented in the UE, aiming to handle the situation proactively. The results of the prediction are signalled to the network, which may utilize the information for the decision making of what kind of configuration to assign the UE (for example, during normal operation in a cell or during a handover) to ensure that any adverse situations are avoided.

The model may be implemented, for example, as a neural network.

Hence, the UE and/or a network element, such as a gNB, may deploy a model that is trained to detect anomalies, i.e., it receives triggers from the UE regarding overheating conditions, high resource consumption and other potential adverse situations, such as if particular UE model capabilities creating an anomalous operating condition. The triggers are labelled and used as input data for the model training phase.

Figure 5A:
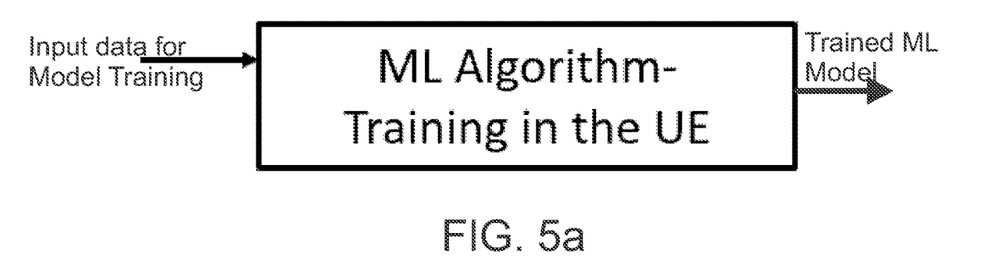
FIGS. 5a-5d show simplified example blocks of machine learning (ML) models in training and inference phases according to some embodiments.
Figure 5B:
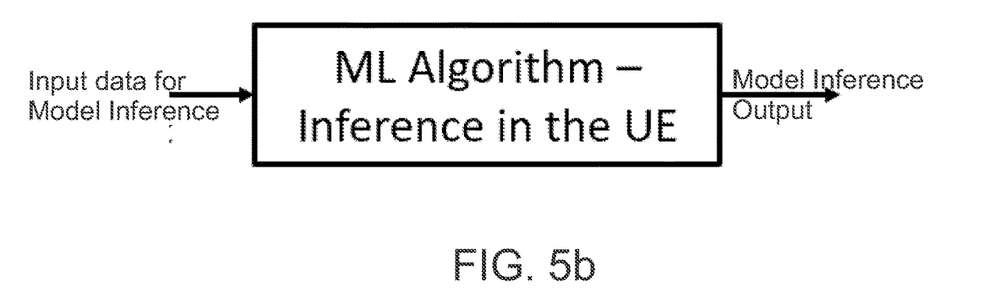
Figure 5C:
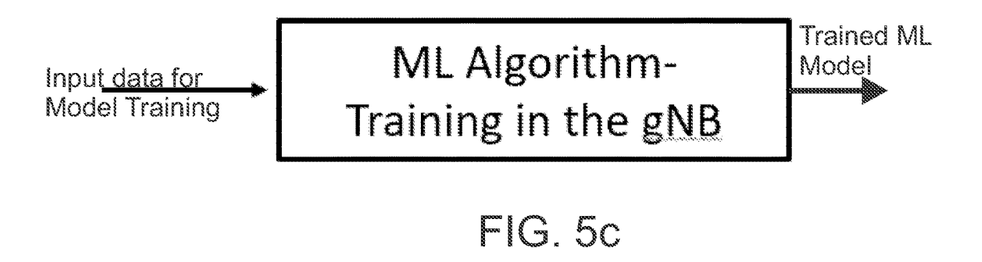
Figure 5D:
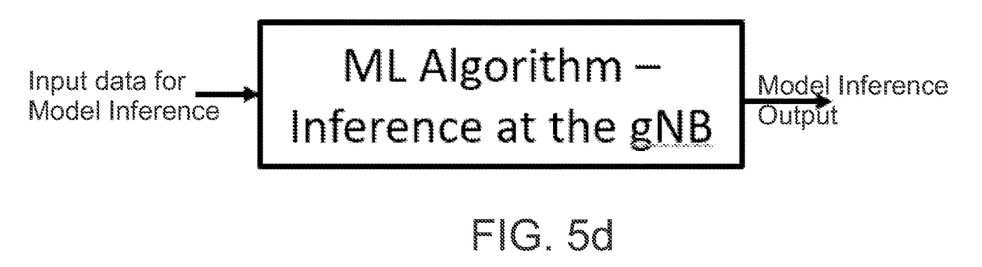

FIGS. 5a and 5b, as well as FIGS. 5c and 5d, show the training and inference of a ML-based model as a simplified block for a UE and a network element, such as a gNB, respectively.

In the training phase (FIG. 5a), the ML-based model implemented in a UE may be trained using various data as input data in the ML algorithm training, which may include, for example, adjustable RRC Reconfiguration parameters, such as a list of possible capabilities and/or their combination, but also feedback from executing model inference, as described below. This may include, for example, band(s) or band combinations for a set of frequency carriers and/or carrier bandwidths and/or modulations. The input data for the training may also include UE Radio measurements & Performance measurements. As a result of the training, a trained ML model is produced, which may be executed by the UE. It is also possible that UE sends the trained ML model to the gNB to be executed there. In this case, a trained ML Model is deployed at the gNB, or at gNB-CU in case of split architecture The trained ML model is used in the inference phase (FIG. 5b.), which may take place, for example, at the time of UE reconfiguration, upon receiving additional signaling, such as a proposed configuration, upon anomaly detection inference at UE, or upon final configuration of the UE. The input data for inference may, for example, trigger a need to reconfigure the UE. The input data may be, for example, a configuration proposed by the gNB, which may include a proposal for a new configuration for one or more of the following: band(s) or band combinations for a set of frequency carriers and/or carrier bandwidths and/or modulations.

The output of the trained ML model in the inference phase may comprise, for example, one or more of the following:
- a list of possible problematic capabilities or their combinations
  - Band(s) or band combinations for a set of frequency carriers and/or carrier bandwidths and/or modulations
- a probability that the proposed RRC Reconfiguration parameter causes anomalous operation
- an anomaly notification to the gNB to enable the gNB to perform an optimal reconfiguration, e.g. to switch to a lower order RRC Configuration.

The Model Inference output may be also used as feedback in the input of an ML Algorithm training to facilitate the training or retraining of an ML Model. For example, the output of FIG. 5b may be used in the input of FIG. 5a.

For predicting the probability for an anomalous situation, the trained ML model of the UE may monitor the number of times over a total number of anomalies that a certain anomaly is observed for a given set of band(s) or band combinations, for a set of frequency carriers, and/or carrier bandwidths, or modulations. The probability may be calculated for each capability separately (e.g., per band or per modulation or per frequency carrier), for each feature separately (e.g., per overheating or in-device co-existence detection), or each feature specific parameter separately (e.g. number of MIMO layers, number of carriers). The UE may then create a distribution of anomalies (e.g. per capability). The UE may then can characterize certain capability, i.e., a band, band combination, frequency carrier, carrier bandwidth and modulation that has the highest probability of anomaly, as a problematic capability. Herein, the definition of an anomaly may be provided by the network.

If the UE has sent the trained ML model to the gNB, the gNB may run/execute the UE-trained ML model to determine the best configuration for a given UE. Thus, the gNB can internally determine the best configuration for a given UE.

For the ML-based model implemented in a gNB, the training phase (FIG. 5c) input data may include, for example, an RRC Reconfiguration that the gNB provides to the UE, or alternative RRC Reconfiguration parameters that the UE may have indicated to prefer.

The trained ML model is used in the inference phase (FIG. 5d.), which may take place, for example, in a situation, where the gNB can predict the best configuration parameters for a given UE or class of UEs. The input data for inference may include, for example, an input provided by the UE to the gNB on the preferred or predicted preferred RRC configuration parameters, or a proposed RRC Reconfiguration that gNB has originally provide to the UE.

The output of the trained ML model in the inference phase may comprise, for example, one or more of the following:
- a preferred RRC Configuration per UE or per class of UEs
- an indication, determined based on the preferred UE configuration, whether to maintain the originally proposed configuration or to update the original configuration to another preferred by the UE.

Again, the Model Inference output may be also used as feedback in the input of an ML Algorithm training to facilitate the training or retraining of an ML Model. For example, the output of FIG. 5d may be used in the input of FIG. 5c.

For predicting the preferred RRC Configuration per UE or per a class of UEs, the gNB may store for a given UE or a group of UEs alternative preferred configuration parameters. The trained ML model of the gNB may create a probability with which certain alternative parameters are chosen by a UE or a group of UEs for a given state (e.g., power level, radio conditions, etc.) or for a state over a group of UEs (e.g., having common radio conditions). The trained ML model of the gNB may calculate a preference probability based on the number of times a certain configuration is selected by a UE or a group of UEs for a given state as opposed to the rest of the configurations. The trained ML model of the gNB may then predict that when a UE or a set of UEs is in a certain condition (radio condition, power level, etc.), it has a higher probability to select or at least prefer certain parameters. Based on the prediction, the gNB may either keep the original configuration or may propose an updated configuration.

The model may also be implemented, for example, as a rule-based model.

Hence, instead of training a neural network, a rule-based (i.e. non-learned) network, such as a Hidden Markov Model (HMM) or a Bayesian network, may be used for predicting the potential anomalous operating conditions. In a Bayesian network, an event that occurred may be modelled by a probabilistic graphical model that represents a set of variables and their conditional dependencies, wherein the likelihood that anyone(s) of several possible known causes was the contributing factor to the event may be predicted. Thus, a Bayesian network can be used to compute the probabilities of various anomalous operating condition emerging based on various configurable features of the UE.

According to an embodiment, said anomalous operating condition comprises one or more of the following:
overheating of the apparatus;
overload of processing resources.

According to an embodiment, said configurable features causing said anomalous operating condition comprise one or more of the following:
frequency band(s) or band combinations for a set of frequency carriers and/or carrier bandwidths and/or modulations;
Artificial Intelligence/Machine Learning (AI/ML) algorithms implemented in said apparatus;
Machine Learning (ML) models processed in said apparatus;
any combination of the above.

There are various scenarios where the model and its results can be utilised. According to a first scenario, the network requests potential feature sets and their combinations that are prone to high resource usage or may create anomalous situation during runtime from the UE.

According to an embodiment, the method comprises receiving a request, from the network, for informing one or more configurable features of the apparatus potentially causing an anomalous operating condition in said apparatus.

According to an embodiment, said request identifies one or more of said configurable features.

According to an embodiment, the method comprises running said model for the identified one or more features; and signaling information whether any of said identified one or more features of the apparatus infers a predetermined likelihood to cause an anomalous operating condition in said apparatus to the network.

Figure 6:
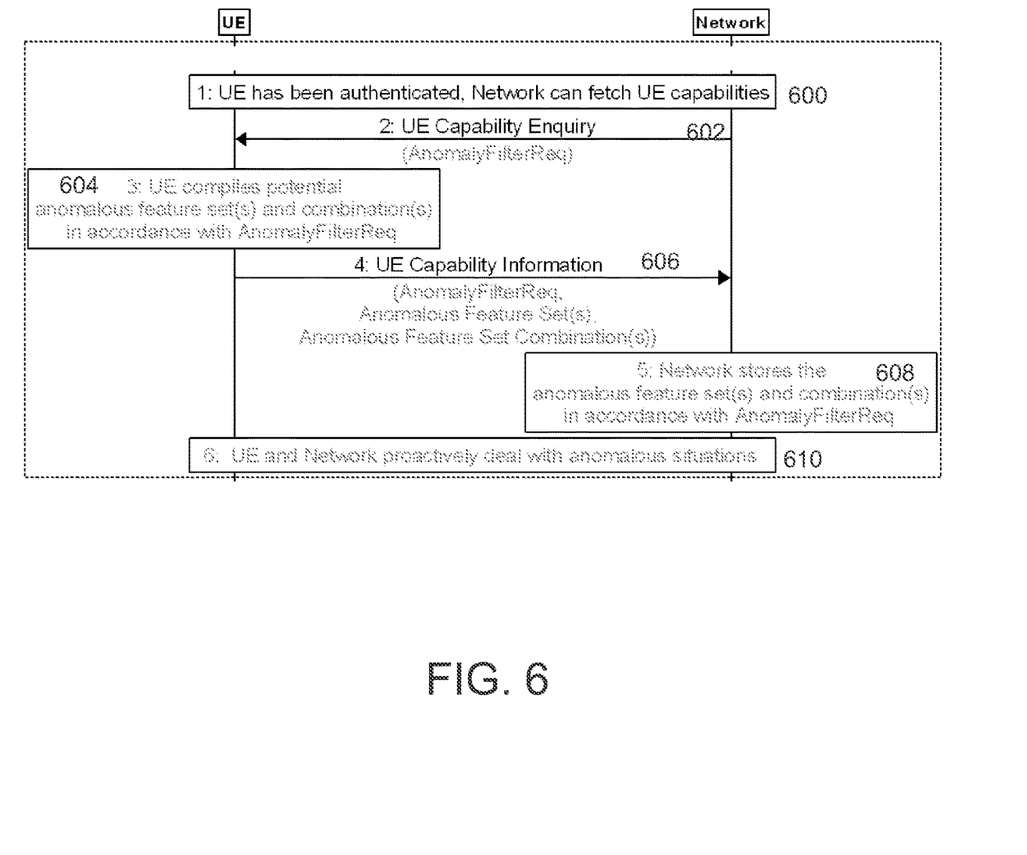
FIG. 6 shows a signalling chart for a network-configured prediction process according to an embodiment.

The flow chart of FIG. 6 illustrates a method according to some of the above embodiments. At an initial stage, the UE has established a connection to the network, and the UE has been authenticated (600). This enables the network, such as an access point, e.g. a gNB, to send a request (602) to UE to inform one or more configurable features of the apparatus potentially causing an anomalous operating condition in the UE. The request may be referred to as, for example, UE Capability Enquiry. The request may include a filter setting for the UE to limit the configurable features to a specific subset of features. For example, the filter may request the UE to inform potential band(s) or band combinations for a set of frequency carriers and/or carrier bandwidths and/or modulations where it is likely that anomalous operation may occur. As another example, the network may request the UE to include information about a prediction relating any AI/ML assisted algorithm(s) in the UE possibly causing anomalous operating conditions when operating under potential band(s) or band combinations for a set of frequency carriers and/or carrier bandwidths and/or modulations. The filter setting requested by the network may be based, for example, on information predicted based on a UE model identifier.

Based on the request, the UE compiles (604) at least one, but possibly a list of several possible problematic capabilities and/or their combinations by executing the algorithm underlying the model that provides the prediction. The UE sends a response message (606) to the network. The response may be referred to as, for example, UE Capability Information. The response may include said list of predicted problematic capabilities. The list may be included in a separate capability container, which may be organized, for example, in a two-dimensional manner, where a first dimension represents the number of anomalous feature sets per band, which may potentially cause high resource utilization in the UE. Each feature set may comprise various features, such as carrier bandwidths, modulations, and/or MIMO layers, indicated for example as, 1400 MHz with 64 QAM. It is also possible that the feature set per band itself may not face any anomalous situation but only when it participates with another band in a band combination. For such cases, the second dimension is required to reflect the combination of different feature sets in given band. For example, 1000 MHz with 64 QAM in Band X and 400 MHz with 256 QAM in Band Y may be seen as potential combination for overheating in the UE.

Based on the content of the response message, the network, such as an access point, e.g. a gNB, stores (608) the list of the possible problematic capabilities and/or their combinations for said UE. Based on the information, the network and UE can proactively deal with anomalous situations (610), for example by the network adjusting RRC reconfigurations in accordance with the information.

According to a second scenario, the UE may dynamically flag features potentially causing an anomalous operating condition, for example, based on RRC reconfiguration parameters suggested by the network, thus providing feedback to the network about potentially problematic issues that may arise upon certain frequency carriers or their combinations during measurement reporting or upon RRC reconfiguration. Based on the received feedback, the network may allow the UE to switch to use a lower order configuration upon encountering an anomalous operating condition identified to be caused by certain feature(s).

According to an embodiment, the method comprises receiving RRC reconfiguration parameters from the network; running said model for the RRC reconfiguration parameters; and signaling information whether any of said RRC reconfiguration parameters infers a predetermined likelihood to cause an anomalous operating condition in said apparatus to the network.

According to an embodiment, the method comprises receiving an indication about RRC reconfiguration parameters selected by the network in a MAC Control Element; and acknowledging the RRC reconfiguration parameters in a RRC Reconfiguration complete message to the network.

According to an embodiment, the method comprises detecting a predetermined likelihood to an anomalous operating condition to take place in said apparatus; sending a request to the network for switching to a lower order RRC configuration; receiving an indication about the lower order RRC reconfiguration parameters selected by the network in a MAC Control Element; and acknowledging the lower order RRC reconfiguration parameters in a RRC Reconfiguration complete message to the network.

Figure 7:
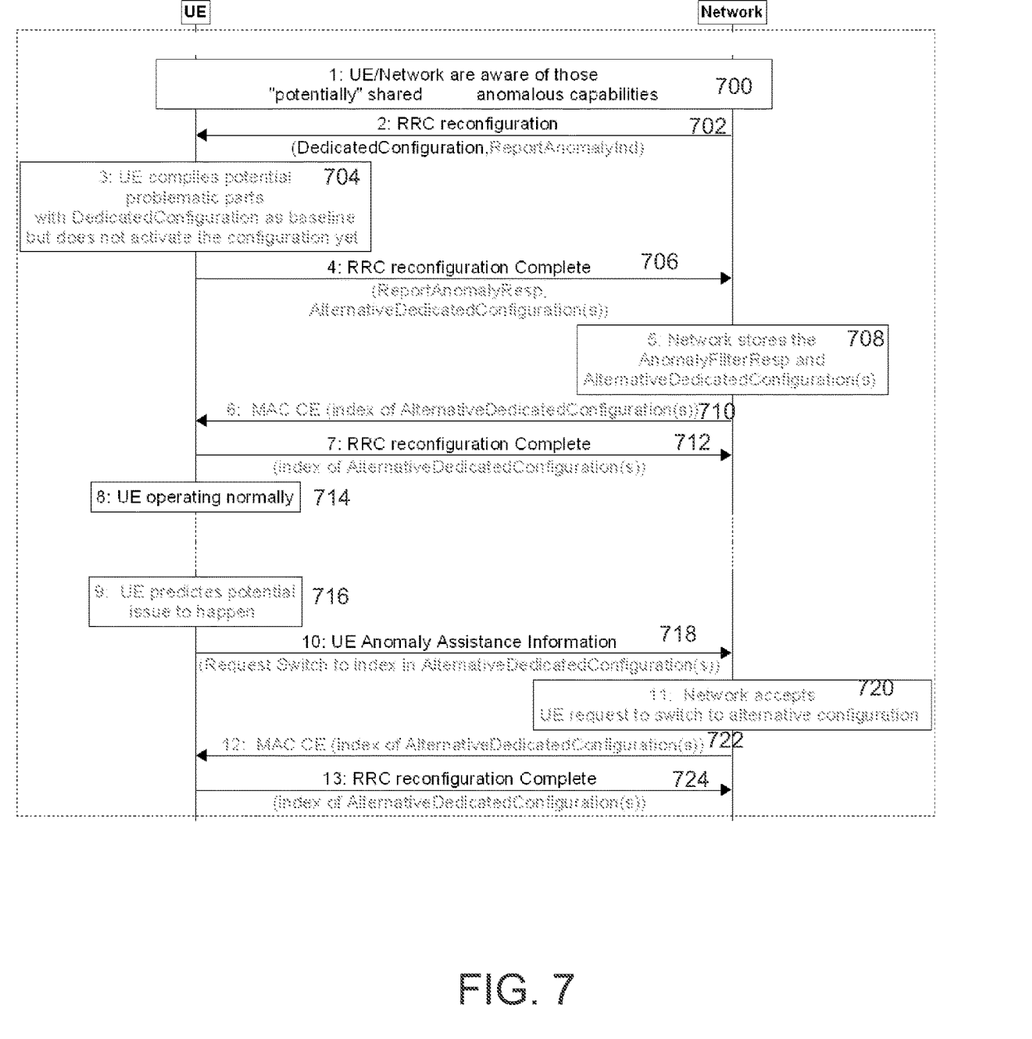
FIG. 7 shows a signalling chart for a prediction process including the UE dynamically flagging features potentially causing an anomalous operating condition according to an embodiment.

Some of the above embodiments relating to the UE flagging the features potentially causing an anomalous operating condition are illustrated in the flow chart of FIG. 7. At an initial stage, the UE and the network may be aware of the problematic capabilities and/or their combinations for said UE (700), and accordingly also the preferable radio reconfiguration parameters for said UE. This enables to network to test various adjustments in radio reconfiguration parameters and their effects to UE performance in terms of inferring possible anomalous operating conditions. Thus, the network sends a RRC Reconfiguration message to the UE (702), wherein the message comprises a dedicated configuration (e.g. adjustment of one or more parameters by a delta value). The RRC Reconfiguration message may also include a request to run the model according to the adjusted parameters and inform the results. The information field of the request may be referred to as, for example, ReportAnomalyInd.

Based on the adjusted parameters, the UE executes the algorithm underlying the model and compiles (704) a list of possible problematic capabilities and/or their combinations. However, the UE does not activate the RRC configuration according to adjusted parameters yet. The UE sends a RRC Reconfiguration Complete message (706) to the network. In the message, the UE specifically labels the alternative configurations using specific labels (such as AlternativeDedicatedConfiguration(s)) that allows the gNB to further activate one of the alternative configurations later on.

The network, such as the gNB, stores (708) the results of the alternative configurations along with the known preferable radio reconfiguration parameters and thus learns how said UE, which may belong to a different UE class or have different UE capabilities, would react, in terms of different performance criteria e.g., energy consumption/overheating/etc., if the reference configuration were to be used. For example, the gNB may learn the preference of different UEs by calculating a probability with which a given UE class or a given UE prefers a given RRC Configuration parameter or a combination of parameters.

Based on the radio reconfiguration parameters stored for said UE, the network may decide to continue with its original proposed configuration in the RRC Reconfiguration message (702), or the network may decide to already activate one of the known preferable radio reconfigurations for the UE. This may be performed by signaling a MAC Control element (CE) (710) to the UE, which may include the index of the selected configuration. The UE activates the configuration according to the index and sends back a RRC Reconfiguration Complete message to the network (712).

The UE then operates normally (714), until at some time instance, the UE predicts an anomalous situation (716) based on its local model and proactively indicates this to the network (718). The message used herein may be referred to as, for example, UE Anomaly Assistance Information, and it may include a request to activate a specific index out of the plurality of alternative dedicated configurations. The network accepts the request (720) and signals the activation of a new configuration by indicating the index of the selected configuration in a MAC CE (722) to the UE. The UE switches to the new configuration according to the index so as to avert the predicted anomaly and sends back a RRC Reconfiguration Complete message to the network (722).

It is noted that the method illustrated in the flow chart of FIG. 7 may also be simplified such that the UE sends only the RRC Reconfiguration Complete message including the labels of the alternative configurations (706) to the network and the network trains a model that allows predictive functionality for detecting possible anomalies before preparing the RRC reconfiguration for a UE. This implies that the network just collects feedback from the UE but does not continue further from the step 708 now including the training of the model.

According to a third scenario, the data gather by the UE about its performance in various operating conditions and identified anomalous operating conditions may be utilized in a handover situation to ensure a resource efficient handover configuration for the UE.

Figure 8:
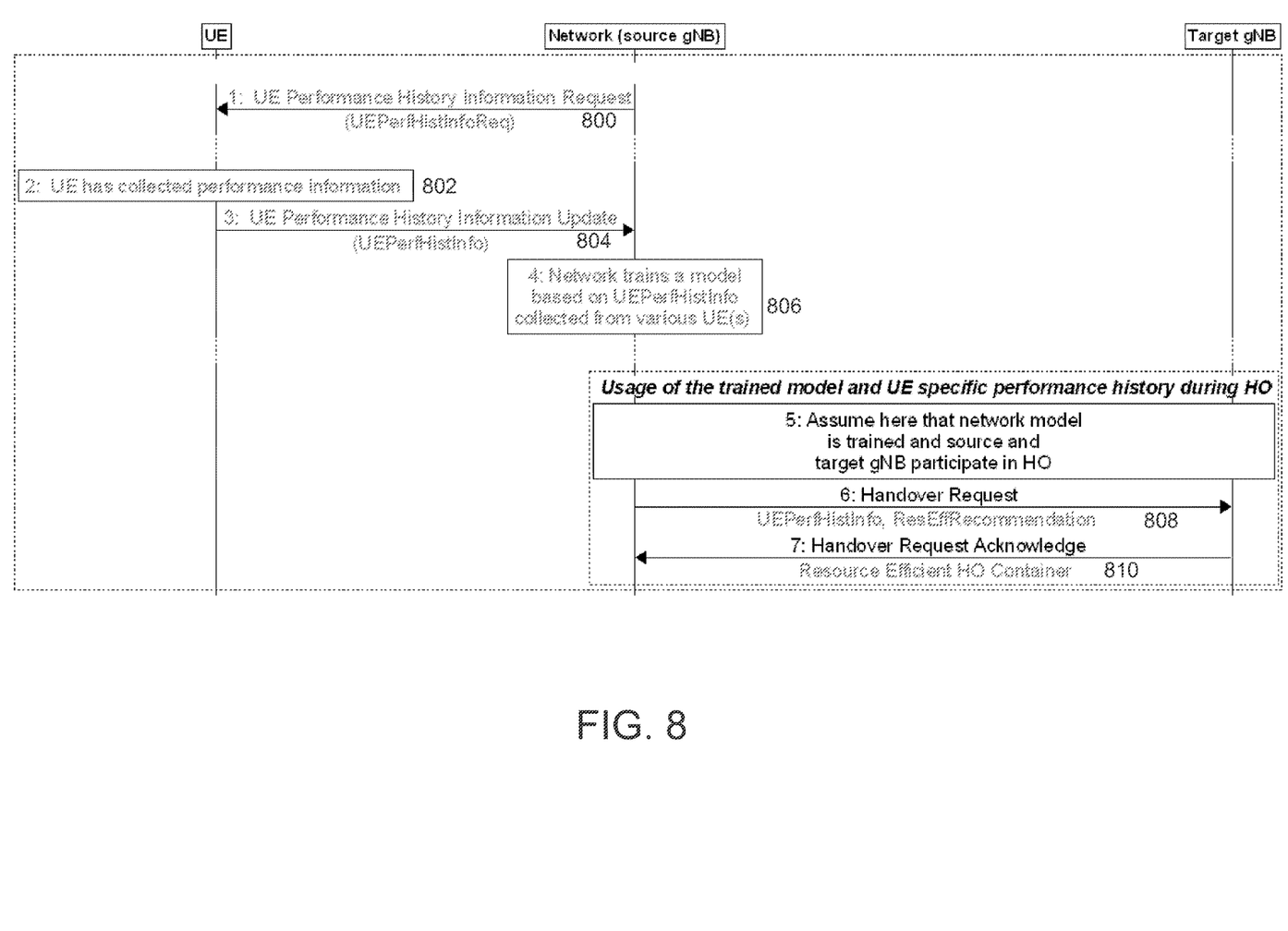
FIG. 8 shows a signalling chart for a resource efficient handover configuration according to another embodiment.

Some embodiments relating to the resource efficient handover configuration are illustrated in the flow chart of FIG. 8. The UE may be configured, typically under the network control, to tag the performance of all used radio configurations in terms of how they are performing compared to the performance expected based on the model. The data collected by this procedure may be referred to as, for example, UE Performance History Information.

The UE may collect this data according to a predetermined setting, or as a response to a signalling from the network. For example, the UE may collect the data across 16 or 32 radio reconfigurations, or the UE may be configured to log all information when adding component carriers of a given bandwidth etc.

In FIG. 8, the source gNB of the HO process may request the collected data from the UE (800), wherein a signalling, herein referred to as UE Performance History Information request, is sent to the UE. The request may either trigger the data collecting at the UE to be started or it may configure the UE to provide the previously collected data. Once the UE has collected the UE Performance History Information (802), the results are sent to the source gNB (804), for example in a signalling referred to as UE Performance History Information Update. In another embodiment, gNB can instruct the UE to report the UE Performance History information together with RRC measurement report.

The source gNB may have its own algorithm-based model, which has been trained and/or updated based on UE Performance History Information obtained from a plurality of UEs previously. Based on the now received UE Performance History Information, the source gNB may then further train and/or update its model (806).

As a part of the handover process, the source gNB shares the UE Performance History Information, possibly supplemented with a Resource Efficient Recommendation with potential target gNB(s), for example in the Handover Request message (808), allowing the target gNB to determine a resource efficient HO configuration. The target gNB acknowledges the determined HO configuration in the Handover Request Acknowledge message (810), which include a container possibly listing aspects of the configuration, which are meant to avoid one or more specific anomalous behavior situations.

It is noted that while FIG. 8 depicts the method using inter-gNB handover signaling, the embodiments are equally applicable in intra-gNB handover signaling.

An apparatus, such as a UE, according to an aspect comprises means for establishing a connection to a network; means for predicting, by an algorithm-based model implemented in said apparatus, whether any of configurable features of the apparatus infers a predetermined likelihood to cause an anomalous operating condition in said apparatus; and means for signaling information about said configurable features to the network.

According to an embodiment, said anomalous operating condition comprises one or more of the following:
  overheating of the apparatus;
  overload of processing resources.

According to an embodiment, said configurable features causing said anomalous operating condition comprise one or more of the following:
  frequency band(s) or band combinations for a set of frequency carriers and/or carrier bandwidths and/or modulations;
  Artificial Intelligence/Machine Learning (AI/ML) algorithms implemented in said apparatus;
  Machine Learning (ML) models processed in said apparatus;
  any combination of the above.

According to an embodiment, the apparatus comprises means for receiving a request, from the network, for informing one or more configurable features of the apparatus potentially causing an anomalous operating condition in said apparatus.

According to an embodiment, said request identifies one or more of said configurable features.

According to an embodiment, the apparatus comprises means for running said model for the identified one or more features; and means for signaling information whether any of said identified one or more features of the apparatus infers a predetermined likelihood to cause an anomalous operating condition in said apparatus to the network.

According to an embodiment, the apparatus comprises means for receiving RRC reconfiguration parameters from the network; means for running said model for the RRC reconfiguration parameters; and means for signaling information whether any of said RRC reconfiguration parameters infers a predetermined likelihood to cause an anomalous operating condition in said apparatus to the network.

According to an embodiment, the apparatus comprises means for receiving an indication about RRC reconfiguration parameters selected by the network in a MAC Control Element; and means for acknowledging the RRC reconfiguration parameters in a RRC Reconfiguration complete message to the network.

According to an embodiment, the apparatus comprises means for detecting a predetermined likelihood to an anomalous operating condition to take place in said apparatus; means for sending a request to the network for switching to a lower order RRC configuration; means for receiving an indication about the lower order RRC reconfiguration parameters selected by the network in a MAC Control Element; and means for acknowledging the lower order RRC reconfiguration parameters in a RRC Reconfiguration complete message to the network.

An apparatus according to a further aspect comprises at least one processor and at least one memory, said at least one memory stored with computer program code thereon, the at least one memory and the computer program code configured to, with the at least one processor, cause the apparatus at least to perform: establish a connection to a network; predict, by an algorithm-based model implemented in said apparatus, whether any of configurable features of the apparatus infers a predetermined likelihood to cause an anomalous operating condition in said apparatus; and signal information about said configurable features to the network.

According to an embodiment, said anomalous operating condition comprises one or more of the following:
  overheating of the apparatus;
  overload of processing resources.

According to an embodiment, said configurable features causing said anomalous operating condition comprise one or more of the following:
  frequency band(s) or band combinations for a set of frequency carriers and/or carrier bandwidths and/or modulations;
  Artificial Intelligence/Machine Learning (AI/ML) algorithms implemented in said apparatus;
  Machine Learning (ML) models processed in said apparatus;
  any combination of the above.

According to an embodiment, the apparatus comprises code causing the apparatus to receive a request, from the network, for informing one or more configurable features of the apparatus potentially causing an anomalous operating condition in said apparatus.

According to an embodiment, said request identifies one or more of said configurable features.

According to an embodiment, the apparatus comprises code causing the apparatus to run said model for the identified one or more features; and code causing the apparatus to signal information whether any of said identified one or more features of the apparatus infers a predetermined likelihood to cause an anomalous operating condition in said apparatus to the network.

According to an embodiment, the apparatus comprises code causing the apparatus to receive RRC reconfiguration parameters from the network; code causing the apparatus to run said model for the RRC reconfiguration parameters; and code causing the apparatus to signal information whether any of said RRC reconfiguration parameters infers a predetermined likelihood to cause an anomalous operating condition in said apparatus to the network.

According to an embodiment, the apparatus comprises code causing the apparatus to receive an indication about RRC reconfiguration parameters selected by the network in a MAC Control Element; and code causing the apparatus to acknowledge the RRC reconfiguration parameters in a RRC Reconfiguration complete message to the network.

According to an embodiment, the apparatus comprises code causing the apparatus to detect a predetermined likelihood to an anomalous operating condition to take place in said apparatus; code causing the apparatus to send a request to the network for switching to a lower order RRC configuration; code causing the apparatus to receive an indication about the lower order RRC reconfiguration parameters selected by the network in a MAC Control Element; and code causing the apparatus to acknowledge the lower order RRC reconfiguration parameters in a RRC Reconfiguration complete message to the network.

Such apparatuses may comprise e.g. apparatuses and/or the functional units disclosed in any of the FIGS. 1-3 and 5a-5d for implementing the embodiments.

A further aspect relates to a computer program product, stored on a non-transitory memory medium, comprising computer program code, which when executed by at least one processor, causes an apparatus at least to perform: establish a connection to a network; predict, by an algorithm-based model implemented in said apparatus, whether any of configurable features of the apparatus infers a predetermined likelihood to cause an anomalous operating condition in said apparatus; and signal information about said configurable features to the network.

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended examples. However, all such and similar modifications of the teachings of this invention will still fall within the scope of this invention.

The invention claimed is:

1. An apparatus comprising at least one processor, and at least one memory including computer program code, wherein the at least one memory and the computer program code are configured, with the at least one processor, to cause the apparatus to:
    establish a connection to a network;
    predict, by an algorithm-based model implemented in said apparatus, whether any of configurable features of the apparatus infers a predetermined likelihood to cause an anomalous operating condition in said apparatus; and
    signal information about said configurable features to the network.

2. The apparatus according to claim 1, wherein said anomalous operating condition comprises one or more of the following:
    overheating of the apparatus;
    overload of processing resources.

3. The apparatus according to claim 1, wherein said configurable features causing said anomalous operating condition comprise one or more of the following:
    frequency band(s) or band combinations for a set of frequency carriers and/or carrier bandwidths and/or modulations;
    Artificial Intelligence/Machine Learning (AI/ML) algorithms implemented in said apparatus;
    Machine Learning (ML) models processed in said apparatus;
    any combination of the above.

4. The apparatus according to claim 1, wherein the at least one memory and the computer program code are further configured, with the at least one processor, to cause the apparatus to
    receive a request, from the network, for informing one or more configurable features of the apparatus potentially causing an anomalous operating condition in said apparatus.

5. The apparatus according to claim 4, wherein said request identifies one or more of said configurable features.

6. The apparatus according to claim 5, wherein the at least one memory and the computer program code are further configured, with the at least one processor, to cause the apparatus to
    run said model for the identified one or more features; and
    signal information whether any of said identified one or more features of the apparatus infers a predetermined likelihood to cause an anomalous operating condition in said apparatus to the network.

7. The apparatus according to claim 1, wherein the at least one memory and the computer program code are further configured, with the at least one processor, to cause the apparatus to
    receive RRC reconfiguration parameters from the network;
    run said model for the RRC reconfiguration parameters; and
    signal information whether any of said RRC reconfiguration parameters infers a predetermined likelihood to cause an anomalous operating condition in said apparatus to the network.

8. The apparatus according to claim 7, wherein the at least one memory and the computer program code are further configured, with the at least one processor, to cause the apparatus to
    receive an indication about RRC reconfiguration parameters selected by the network in a MAC Control Element; and
    acknowledge the RRC reconfiguration parameters in a RRC Reconfiguration complete message to the network.

9. The apparatus according to claim 8, wherein the at least one memory and the computer program code are further configured, with the at least one processor, to cause the apparatus to
    detect a predetermined likelihood to an anomalous operating condition to take place in said apparatus;
    send a request to the network for switching to a lower order RRC configuration;
    receive an indication about the lower order RRC reconfiguration parameters selected by the network in a MAC Control Element; and acknowledge the lower order RRC reconfiguration parameters in a RRC Reconfiguration complete message to the network.

10. A method comprising
establishing, by an apparatus, a connection to a network;
predicting, by an algorithm-based model implemented in said apparatus, whether any of configurable features of the apparatus infers a predetermined likelihood to cause an anomalous operating condition in said apparatus; and
signaling information about said configurable features to the network.

11. The method according to claim 10, wherein said anomalous operating condition comprises one or more of the following:
overheating of the apparatus;
overload of processing resources.

12. The method according to claim 10, wherein said configurable features causing said anomalous operating condition comprise one or more of the following:
frequency band(s) or band combinations for a set of frequency carriers and/or carrier bandwidths and/or modulations;
Artificial Intelligence/Machine Learning (AI/ML) algorithms implemented in said apparatus;
Machine Learning (ML) models processed in said apparatus;
any combination of the above.

13. The method according to claim 10, comprising
receiving a request, from the network, for informing one or more configurable features of the apparatus potentially causing an anomalous operating condition in said apparatus.

14. The method according to claim 13, comprising
running said model for the identified one or more features; and
signaling information whether any of said identified one or more features of the apparatus infers a predetermined likelihood to cause an anomalous operating condition in said apparatus to the network.

15. The method according to claim 10, comprising
receiving RRC reconfiguration parameters from the network;
running said model for the RRC reconfiguration parameters; and
signaling information whether any of said RRC reconfiguration parameters infers a predetermined likelihood to cause an anomalous operating condition in said apparatus to the network.

* * * * *